US011418771B1

(12) United States Patent
Huang

(10) Patent No.: US 11,418,771 B1
(45) Date of Patent: Aug. 16, 2022

(54) METHOD FOR CALIBRATING 3D CAMERA BY EMPLOYING CALIBRATED 2D CAMERA

(71) Applicant: TECHMAN ROBOT INC., Taoyuan (TW)

(72) Inventor: Chung-Hsien Huang, Taoyuan (TW)

(73) Assignee: TECHMAN ROBOT INC., Taoyuan (TW)

( * ) Notice: Subject to any disclaimer, the term of this patent is extended or adjusted under 35 U.S.C. 154(b) by 41 days.

(21) Appl. No.: 17/163,540

(22) Filed: Jan. 31, 2021

(51) Int. Cl.
*H04N 13/246* (2018.01)
*G06T 7/80* (2017.01)
*G06T 7/90* (2017.01)

(52) U.S. Cl.
CPC .............. *H04N 13/246* (2018.05); *G06T 7/85* (2017.01); *G06T 7/90* (2017.01); *G06T 2207/10024* (2013.01); *G06T 2207/10028* (2013.01)

(58) Field of Classification Search
CPC ........... H04N 13/246; G06T 7/85; G06T 7/90; G06T 2207/10024; G06T 2207/10028
See application file for complete search history.

(56) References Cited

U.S. PATENT DOCUMENTS

| 9,734,419 B1 | 8/2017 | Ye |
| 2019/0105781 A1 | 4/2019 | Harada |

FOREIGN PATENT DOCUMENTS

| CN | 109648605 A | 4/2019 |
| CN | 112017251 A | 12/2020 |
| EP | 3 525 000 A1 | 8/2019 |
| WO | 2020/233443 A1 | 11/2020 |

OTHER PUBLICATIONS

Van-Dung Hoang et al., Closed-Form Solution to 3D Points for Estimating Extrinsic Parameters of Camera and Laser Sensor, 2014 IEEE, pp. 1932-1937, IEEE, XP032624082, 2014.
Guoliang Hu et al., Non-linear calibration optimisation based on the Levenberg-Marquardt algorithm, IET Image Process., 2020, vol. 14, Iss. 7, pp. 1402-1414, The Institution of Engineering and Technology 2020, XP006090434, Apr. 30, 2020.

*Primary Examiner* — Farzana Hossain
(74) *Attorney, Agent, or Firm* — Winston Hsu

(57) ABSTRACT

A method for calibrating a 3D camera includes arranging a 3D object and a background with contrast color on surfaces, and capturing the 3D object to get an image by a 2D camera and capturing a point cloud by the 3D camera in a one-pass operation. The raw colors of the 3D object and the background of the point cloud are separated and recorded. The point cloud of the 3D object and the background are transformed into the position of the corresponding pixel in the image to get transformed colors. The missing score is computed based on color changes of the point cloud. The transform parameter transforming the coordinate systems of the cameras is optimized to reduce the missing score, so as to quickly calibrate the 3D camera.

9 Claims, 6 Drawing Sheets

METHOD FOR CALIBRATING 3D CAMERA BY EMPLOYING CALIBRATED 2D CAMERA

BACKGROUND OF THE INVENTION

1. Field of the Invention

The present disclosure relates to a method of calibrating a 3D camera, in particular, to a method of calibrating a 3D camera coordinate system by employing a calibrated 2D camera.

2. Description of the Prior Art

Due to the rapid development of artificial intelligence, factories employ three-dimensional (3D) cameras to automate processes and assemblies in manufacturing processes for robotic arms, enhancing production efficiency of the factories. The accuracy of a mapping relationship between a coordinate system of the 3D camera and a coordinate system of the robotic arm can affect the precision of a production.

In the related art, coordinate systems of two-dimensional (2D) cameras are calibrated by placing a checkerboard pattern or a derived distortion pattern thereof in the field of view of the 2D camera, recording corner points of the checkerboard pattern of a known size from images captured, and moving the checkerboard pattern from place to place to take images thereof for use to calibrate a transform mapping between the coordinate systems of the 2D cameras. A 3D camera is also referred to as a depth camera, and may also carry 2D information such as RGB color information, monochrome information or grayscale information. When a 3D camera has high-quality 2D information, the 2D information of the 3D camera is usually used to calibrate a transform mapping between coordinate systems of 3D cameras by the calibration method for 2D cameras.

If the 3D camera does not have color information, or the 2D information is insufficient to perform precise positioning, the 3D information of the checkerboard pattern will be used for calibration. The 3D information of the checkerboard pattern includes position information represented by a depth map and a point cloud. The depth map and the point cloud may be transformed by internal parameters of the camera, and represent substantially the same 3D information. Using the principle of all corner points of the checkerboard pattern being on the same plane, the transform mapping between the corner points of the checkerboard pattern detected by the 3D camera and the 2D camera can be computed to obtain parameters for transforming the coordinate systems of the 3D camera and the 2D camera, so as to perform a calibration.

However, for the transform mapping between the coordinate systems in the related art, since the 3D information of the 3D camera is usually more accurate at the center, and becomes increasingly inaccurate toward the edge, information at edge positions of the checkerboard pattern will be less accurate, leading to errors of the transform mapping between coordinate systems, resulting in imprecise calibration of the coordinate system of the 3D camera. In addition, it is required to move the checkerboard pattern to a plurality of positions for the 3D camera to photograph, slowing down the calibration. Therefore, problems need to be solved in the calibration method of 3D cameras.

SUMMARY OF THE INVENTION

According to one embodiment of the disclosure, a method of calibrating a 3D camera includes utilizing a 3D object and a background with color contrast on the surfaces for a 2D camera to capture an image and for the 3D camera to capture a point cloud, transforming color information at positions of the 3D object and the background in image captured by the 2D camera, computing a missing score of color changes in the point cloud of the 3D object and the point cloud of the background, optimizing the transform parameters to reduce the missing score to less than the threshold, achieving a quick calibration for the 3D camera.

The method of calibrating the 3D camera further includes pre-calibrating a coordinate system of the 2D camera, arranging a 3D camera to be calibrated in a proximity to the 2D camera, arranging a 3D object and a background having color contrast, e.g., in black and white on the surfaces in a common field of view of the 3D camera and the 2D camera, controlling the 2D camera to capture the image, controlling the 3D camera to capture the point cloud, separating a point cloud of the 3D object and a point cloud of the background captured by the 3D camera, recording raw colors of the point cloud of the 3D object and raw colors of the point cloud of the background, transforming the point cloud of the 3D object and the point cloud of the background into coordinates in a 2D camera coordinate system using the a default value of a transform parameter, obtaining transformed colors from positions of the 3D object in the image captured by the 2D camera according to the transformed point cloud of the 3D object, or from positions of the background in the image captured by the 2D camera according to the transformed point cloud of the background, comparing raw colors and the transformed colors of the point cloud of the 3D object and the point cloud of the background to compute a missing score of the point cloud of the 3D object and the point cloud of the background, and determining whether the missing score is less than a predetermined threshold, and if so, determining that a transform mapping from a coordinate system of the 3D camera to the coordinate system of the 2D camera is completed.

In some embodiments, the method includes pre-calibrating a transform mapping between the coordinate system of the 2D camera and a coordinate system of a robotic arm, and obtaining a transform mapping between the coordinate system of the 3D camera and the coordinate system of the robotic arm using the calibrated 2D camera. In some embodiments, the default value of the transform parameter is configured to overlap the image and the point cloud, and changing the transform parameter is equivalent to shifting overlapping positions of the point cloud and the image.

In some embodiments, the method includes if the missing score is not less than a predetermined threshold, optimizing the predetermined transform parameter to reduce the missing score, changing the predetermined transform parameter, and re-computing another missing score of the point cloud of the 3D object and the point cloud of the background. In some embodiments, the method includes determining color changes between the transformed colors and the raw colors, and counting the color change to determine the missing score, wherein no color change between the transformed colors and the raw colors is counted as no change in the missing score. In some embodiments, the method includes separately computing the missing scores of color changes of the object point cloud and the point cloud of the background, and then summing the missing scores of color changes of the object point cloud and the point cloud of the background.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
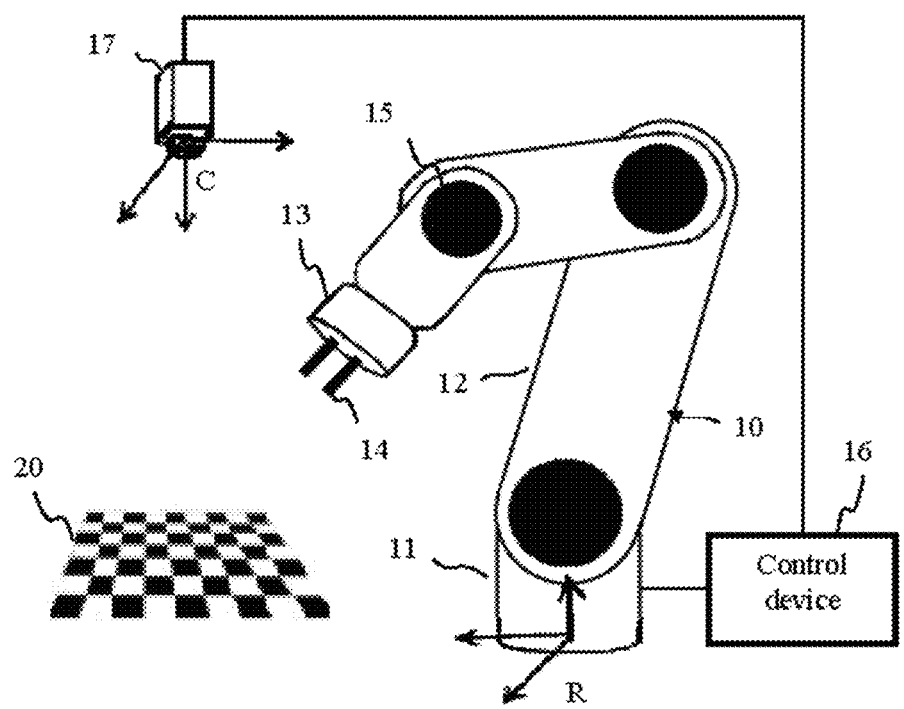
FIG. 1 is a schematic diagram of a calibration of a robotic arm and a 2D camera according to an embodiment of the present disclosure.

FIG. 1 is a schematic diagram of a calibration of a robotic arm and a 2D camera according to an embodiment of the present disclosure. In FIG. 1, one end of a robotic arm 10 is a fixed base 11 sequentially connected to a plurality of shafts 12 to form a movable end portion 13 at the other end of the robotic arm 10. A tool 14 is arranged at the end portion 13, and actuator motors 15 are respectively arranged at each shaft 12 and connected to a control device 16. The control device 16 of the robotic arm 10 controls the rotation angles of the actuator motors 15 of each shaft 12, so as to move the tool 14 at the end portion 13 of the robotic arm 10. The robotic arm 10 of the present disclosure employs the fixed base 11 as a reference point to form an arm coordinate system R of the robotic arm 10. The control device 16 may calculate a movement position of the tool 14 according to known lengths of each shaft 12 and the tool 14 at the end portion 13 of the robotic arm 10, and according to the rotation angles of the actuator motors 15 of each shaft 12, so as to position coordinates of the tool 14 in the arm coordinate system R to accurately move the tool 14.

In the present disclosure, a 2D camera 17 is installed in the working environment of the robotic arm 10, the field captured by the 2D camera 17 forms a camera coordinate system C, and the information captured by the 2D camera 17 is transmitted to the control device 16 for processing. A calibration tool 20 having a checkerboard pattern or various deformation derivatives thereof is disposed in the working environment of the robotic arm 10 and is present in the field of view of the 2D camera 17. The calibration tool 20 and the robotic arm 10 have a known positional relationship, and the 2D camera 17 may be used to capture and record an imaging position of the calibration tool 20 of a known size in the image, and the robotic arm 10 may be operated to contact multiple checkerboard corner points, so as to complete a pre-calibration for a transform mapping between the coordinate system C of the 2D camera 17 and the coordinate system R of the robotic arm 10 as in the related art. While the 2D camera 17 is installed externally to the robotic arm 10 in the embodiment, the disclosure is not limited by the configuration. The 2D camera 17 may also be fixed on the robotic arm 10, and the pre-calibration of the transform mapping between the coordinate system C of the 2D camera 17 and the coordinate system R of the robotic arm 10 may be achieved using a fixed relative position of the 2D camera 17.

Figure 2:
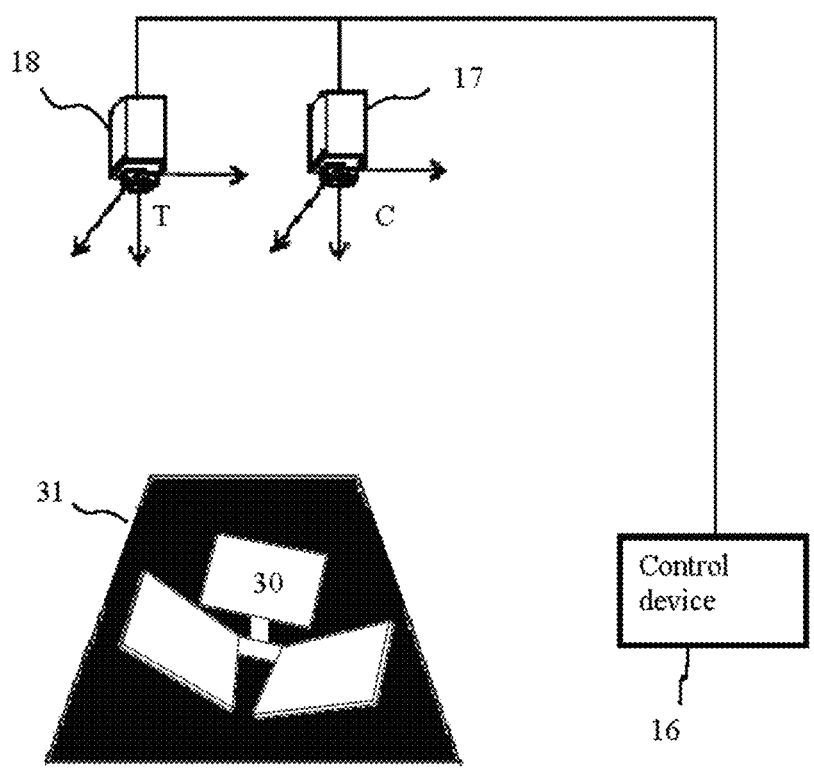
FIG. 2 is a schematic diagram of using a 2D camera to calibrate a 3D camera according to an embodiment of the present disclosure.
Figure 3:
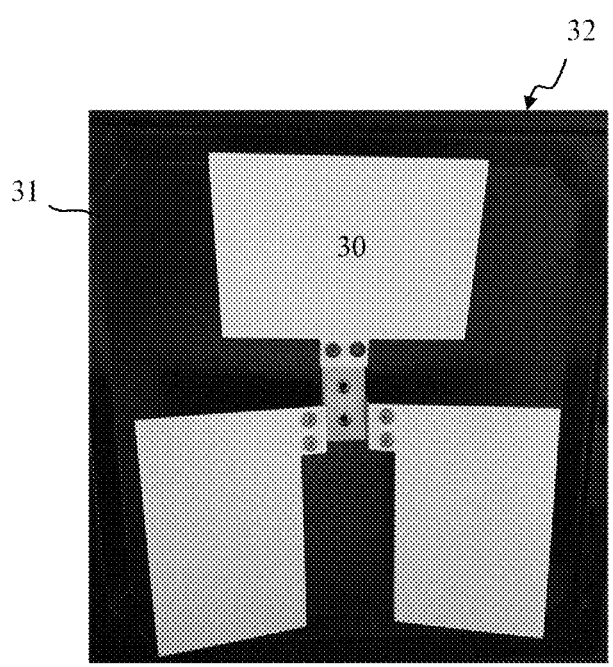
FIG. 3 is an image of a 3D object captured by a 2D camera according to an embodiment of the present disclosure.
Figure 4:
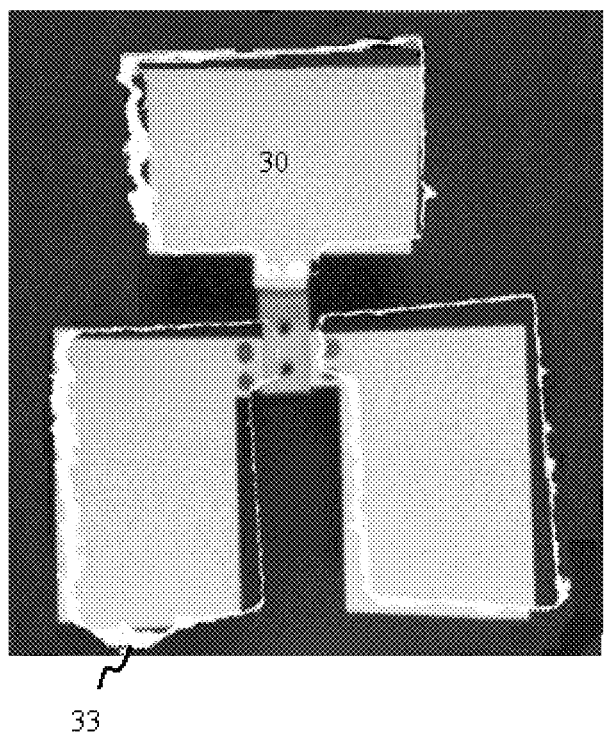
FIG. 4 is an overlapping view of an image and a point cloud of a 3D object according to an embodiment of the present disclosure.
Figure 5:
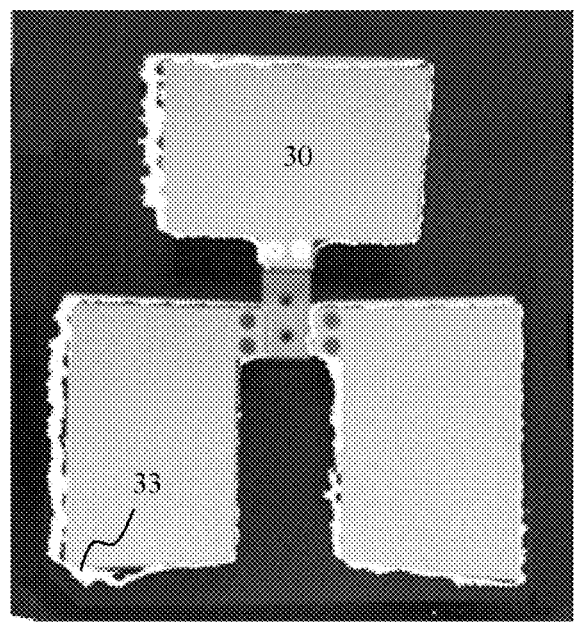
FIG. 5 is an overlay view of an image and a point cloud of a 3D object according to an embodiment of the present disclosure.

Please refer to FIGS. 2 to 5. FIG. 2 is a schematic diagram of using a 2D camera to calibrate a 3D camera according to an embodiment of the present disclosure, FIG. 3 is an image of a 3D object captured by the 2D camera according to an embodiment of the present disclosure, FIG. 4 is an overlapping view of the image and the point cloud of the 3D object according to an embodiment of the present disclosure, and FIG. 5 is an overlay view of the image and the point cloud of the 3D object according to an embodiment of the present disclosure. In FIG. 2, the calibrated 2D camera 17 may be placed in the proximity to a 3D camera 18 in need of a calibration. The field captured by the 3D camera 18 may form a camera coordinate system T, and the 3D camera 18 may be connected to the control device 16 for the 3D camera 18 to receive control from the control device 16 and for the control device 16 to process the information captured by the 3D camera 18. A 3D object 30 and a background 31 having a color contrast on the surfaces may be placed in a common field of view of the camera 18 and the 2D camera 17, the 2D camera 17 may be controlled to capture an image 32 of the 3D object 30 (refer to FIG. 3), while the 3D camera 18 may be controlled to capture a point cloud 33 of the 3D object 30 (refer to FIG. 4). In one example, the 3D object 30 may be white in color, the background 31 may be black in color. Nevertheless, the present disclosure may include, but is not limited to, black and white contrasting colors. The reason for having the contrasting colors on the surfaces of the 3D object 30 and the background 31 is to display the strong color contrast between the 3D object 30 and the background 31 on the image 32 and the point cloud 33, so as to enable the 3D camera 18 and the 2D camera 17 to perform image processing to quickly identify the difference. In addition, while a three-plate 3D object 30 is adopted in the embodiment, the present disclosure is not limited thereto, other 3D objects may be applicable to the disclosure.

Using the contrasting colors on the surfaces, a point cloud of the 3D object 30 and a point cloud of the background 31 captured by the 3D camera 18 may be separated, and the raw colors of the point cloud of the 3D object 30 and the point cloud of the background 31 may be recorded. In FIG. 4, the image 32 and the point cloud 33 may be overlapped using a default value of a transform parameter, the point cloud of the 3D object 30 and the point cloud of the background 31 may be transformed into the coordinates in the coordinate system C of the 2D camera 17, and the transformed color of each point in the point clouds at a position of the 3D object 30 or the background 31 in the image 32 of the 2D camera 17 may be obtained according to the transformed point cloud of the 3D object 30 and the transformed point cloud of the background 31, with reference to the image 32 of the 2D camera 17. Then the transformed color and the recorded raw color of each point in each point cloud are compared, e.g., the position of a point in the point cloud of the 3D object 30 is located at the position of a point of the background 31 in the image 32, or the position of a point in the point cloud of the background 31 is located at the position of a point of the 3D object 30 in the image 32. When the transformed color is different from the raw color, a color change has occurred. A color change in a point cloud may be counted as a missing score, and no color change in a point cloud may be counted as no missing score. A missing score of the color change in the point cloud may be counted. Alternatively, a missing score of the color change of the point cloud of the 3D object 30 and a missing score of the color change of the point cloud of the background 31 may counted separately, and then the missing scores are summed to generate a missing score of the color change.

Next the missing score may be checked. If the missing score is not less than a predetermined threshold, the calibration of the 3D camera 18 has not yet completed, the transform parameter may be changed, i.e., changing the positions of the point cloud 33 overlapped to the image 32, and the preceding color change determination step may be repeated. The missing score may be further optimized and reduced until the missing score is less than the predetermined threshold, that is, the 3D object 30 in the image 32 and the point cloud of the 3D object 30 in the point cloud 33 are substantially overlaid (referred to FIG. 5), and the transform mapping between the coordinate system T of the 3D camera 18 and the coordinate system C of the 2D camera 17 is completed, achieving the calibration of the transform mapping between the coordinate system T of the 3D camera 18 and the coordinate system C of the 2D camera 17. Therefore, the transform mapping between the coordinate system T of the 3D camera 18 and the coordinate system R of the robotic arm 10 may be obtained using the calibrated 2D camera 17.

Figure 6:
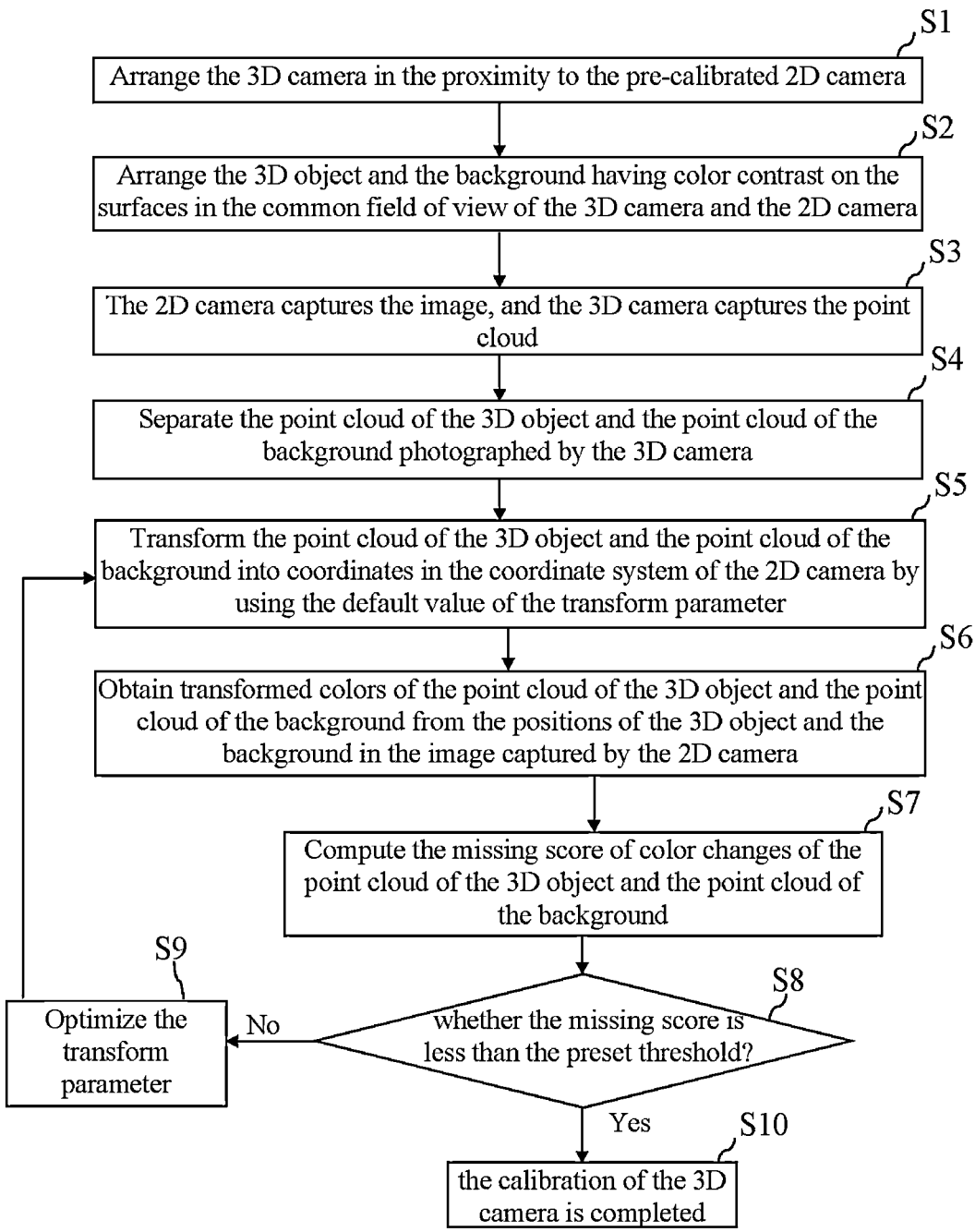
FIG. 6 is a flowchart of a calibration method of a 3D camera according to an embodiment of the present disclosure.

FIG. 6 is a flowchart of a calibration method of the 3D camera according to an embodiment of the present disclosure. Steps of the calibration method of the 3D camera are detailed as follows: First in Step S1, pre-calibrate the coordinate system of the 2D camera, and arrange the 3D camera to be calibrated in the proximity to the 2D camera; In Step S2, arrange the 3D object and the background having a color contrast on the surfaces in the common field of view of the 3D camera and the 2D camera; Next in Step S3, control the 2D camera to capture the image, and control the 3D camera to capture the point cloud; In Step S4, separate the point cloud of the 3D object and the point cloud of the background captured by the 3D camera, and record the raw colors of the point cloud of the 3D object and the raw colors of the point cloud of the background; In Step S5, transform the point cloud of the 3D object and the point cloud of the background into coordinates in the coordinate system of the 2D camera by using the default value of the transform parameter; In Step S6, obtain transformed colors information from the positions of the 3D object in the image captured by the 2D camera according to the transformed point cloud of the 3D object, or from the positions of the background in the image captured by the 2D camera according to the transformed point cloud of the background; In Step S7, compare the raw colors and the transformed colors of each point cloud, and compute the missing score of color changes; In Step S8, determine whether the missing score is not less than the preset threshold, and if so, go to Step S9, optimize the transform parameter to reduce the missing score, change the transform parameter, and go back to Step S5 to repeat the preceding missing score computation step, if the missing score is less than the predetermined threshold, go to Step S10 to complete the transform mapping between the coordinate system of the 3D camera and the coordinate system of the 2D camera.

Therefore, the calibration method of the 3D camera in the present disclosure includes utilizing the 3D object and the background with color contrast on the surfaces for the 2D camera to capture the image and for the 3D camera to the capture the point cloud in an one-pass operation, separating and recording the raw colors of the point cloud of the 3D object and the point cloud of the background, and overlapping the image and the point cloud, transforming the color information at the positions of the 3D object and the background in image captured by the 2D camera, computing the missing score of color changes in the point cloud of the object and the point cloud of the background, continuing to perform digital computation and optimization of the transform parameters to reduce the missing score to less than the threshold, so as to substantially overlay the image of the 3D object in the image and the point cloud of the 3D object in the point cloud, and obtain the transform parameters of the coordinate system, thereby achieving a quick calibration for the 3D camera using a one-pass photographing and quick digital computation.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of calibrating a three dimensional (3D) camera, the method comprising: pre-calibrating a two dimensional (2D) camera coordinate system, and arranging the 3D camera to be calibrated in a proximity to a 2D camera; arranging in a common field of view of the 3D camera and the 2D camera a 3D object and a background having color contrast on surfaces; controlling the 2D camera to capture an image, and controlling the 3D camera to capture a point cloud; separating a point cloud of the 3D object and a point cloud of the background captured by the 3D camera, and recording raw colors of the point cloud of the 3D object and raw colors of the point cloud of the background; transforming the point cloud of the 3D object and the point cloud of the background into coordinates in the 2D camera coordinate system using a default value of a predetermined transform parameter; obtaining transformed colors information from positions of the 3D object in the image captured by the 2D camera according to the transformed point cloud of the 3D object, or from positions of the background in the image captured by the 2D camera according to the transformed point cloud of the background; comparing raw colors and the transformed colors of the point cloud of the 3D object and the point cloud of the background to compute a missing score of the point cloud of the 3D object and the point cloud of the background; and determining whether the missing score is less than a predetermined threshold, and if so, determining that a transform mapping from a coordinate system of the 3D camera to the coordinate system of the 2D camera is completed.

2. The method of claim 1, wherein the pre-calibrating the 2D camera coordinate system comprises calibrating the coordinate system of the 2D camera and a coordinate system of a robotic arm to determine a transform mapping therebetween.

3. The method of claim 2, further comprising obtaining a transform mapping between the coordinate system of the 3D camera and the coordinate system of the robotic arm using the calibrated 2D camera.

4. The method of claim 1, wherein the 3D object is white on a surface thereof and the background is black on a surface thereof.

5. The method of claim 1, further comprising if the missing score is not less than the predetermined threshold, optimizing the predetermined transform parameter to reduce the missing score, changing the predetermined transform parameter, and re-computing another missing score of the point cloud of the 3D object and the point cloud of the background.

6. The method of claim 5, wherein the default value of the predetermined transform parameter is configured to overlap the image and the point cloud.

7. The method of claim 5, wherein the changing the predetermined transform parameter is equivalent to shifting overlapping positions of the point cloud and the image.

8. The method of claim 1, wherein comparing the raw colors and the transformed colors of the point cloud of the 3D object and the point cloud of the background to compute the missing score of the point cloud of the 3D object and the point cloud of the background comprises:
   determining color changes between the transformed colors and the raw colors; and
   counting the color change to determine the missing score, wherein no color change between the transformed colors and the raw colors is counted as no change in the missing score.

9. The method of claim 1, wherein comparing the raw colors and the transformed colors of the point cloud of the 3D object and the point cloud of the background to compute the missing score of the point cloud of the 3D object and the point cloud of the background comprises:
   computing a score of color changes for the point cloud of the 3D object, and a score of color changes for the point cloud of the background; and
   then summing the scores of color changes of the object point cloud and the point cloud of the background to generate a missing score.

* * * * *